United States Patent [19]

Field

[11] 3,797,634
[45] Mar. 19, 1974

[54] ADJUSTABLE PLURAL CONVEYOR

[76] Inventor: Owen L. Field, c/o Claser Bros., 4800 S. Bogle Ave., Corona del Mar, Calif. 90058

[22] Filed: Feb. 3, 1971

[21] Appl. No.: 112,338

Related U.S. Application Data

[62] Division of Ser. No. 873,185, Nov. 3, 1969, Pat. No. 3,616,944.

[52] U.S. Cl. ................................. 198/43, 193/35 R
[51] Int. Cl. ...................... F16d 13/04, F16d 23/00
[58] Field of Search............... 193/35 R, 35 T, 35 E; 198/20 T, 2–3, 43, 45, 50; 214/41; 186/1

[56] References Cited
UNITED STATES PATENTS

| | | | |
|---|---|---|---|
| 2,204,828 | 6/1940 | Sherrill | 198/2 X |
| 2,979,178 | 4/1961 | Hamre | 193/35 TE |
| 3,580,141 | 5/1971 | Richter | 198/20 T |
| 2,609,076 | 9/1952 | Brent | 193/35 TE |
| 1,065,989 | 7/1913 | Verbeke | 193/35 TE |

Primary Examiner—Edward A. Sroka
Attorney, Agent, or Firm—Julian Caplan

[57] ABSTRACT

A conveyor system for efficiently filling, checking, loading and delivering a variety of items of merchandise to a large number of customers using a plurality of trucks. Salesmen's orders, each covering a large number of separate items, are written on two different forms (Form A for cigarettes, Form B for cigars, e.g.). The forms are then collated in accordance with pre-established route lists, listing for each truck delivery the customer stops in order. Orders are filled by warehousemen in reverse order of the route lists, Form A orders on conveyor A and Form B orders on conveyor B, the merchandise being moved along to a station, where the orders are packed up and taken to an invoice clerk for billing. Conveyor A has an elevator which places it immediately on top of conveyor B. Each conveyor has a switch making it possible to switch the merchandise to either of two parallel, double-deck storage conveyors of extended length leading to separate loading docks. All merchandise for a particular truck is stored on one of these storage conveyors while being invoiced and is then checked and loaded into the truck in inverse order of delivery, the Form A merchandise on a telescopic loading conveyor fitting into the front of the truck above the Form B merchandise.

1 Claim, 7 Drawing Figures

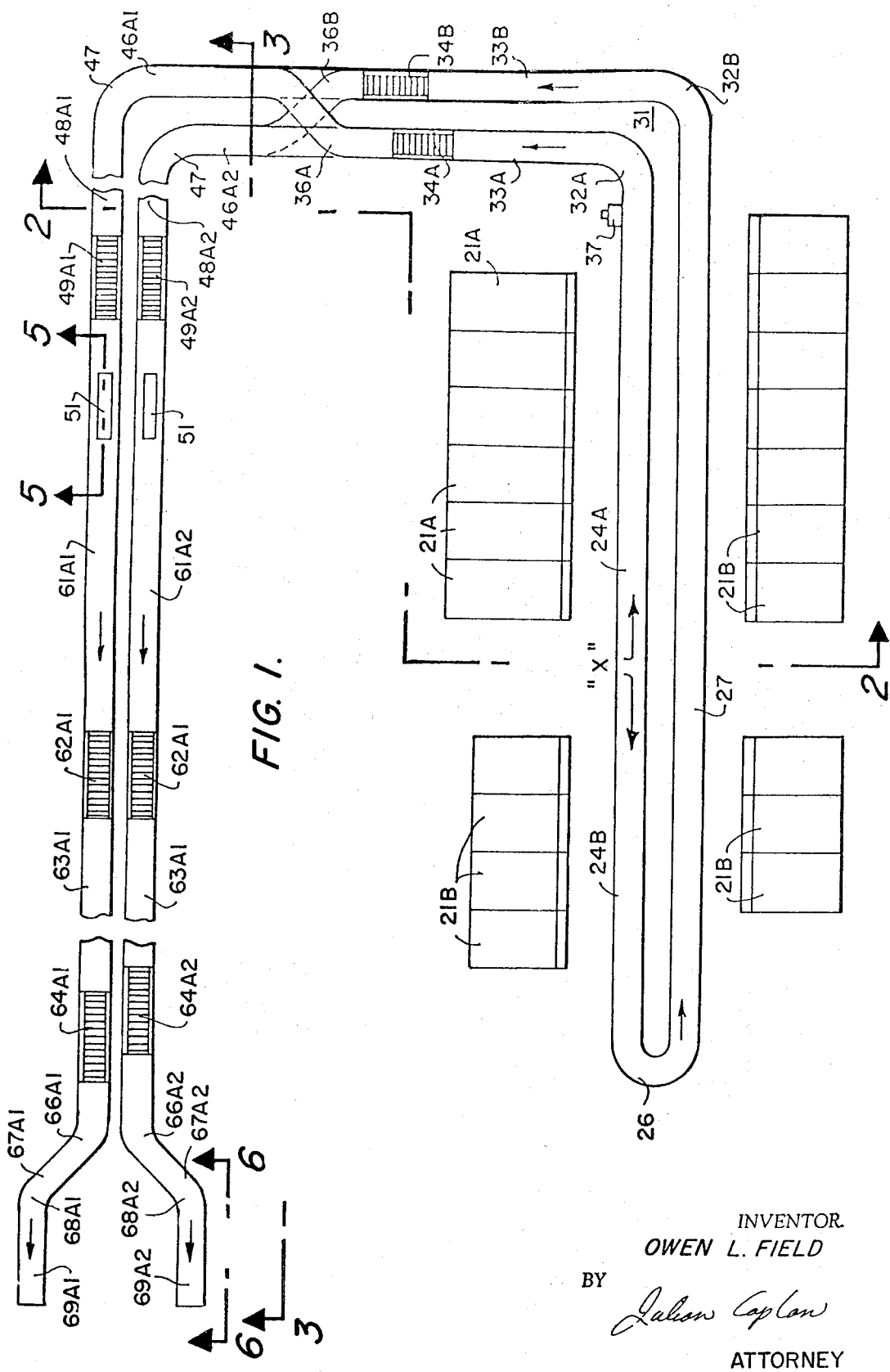

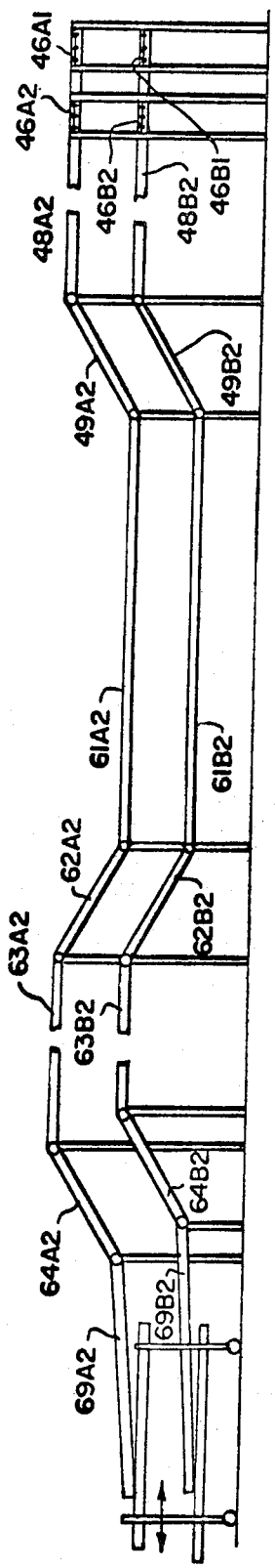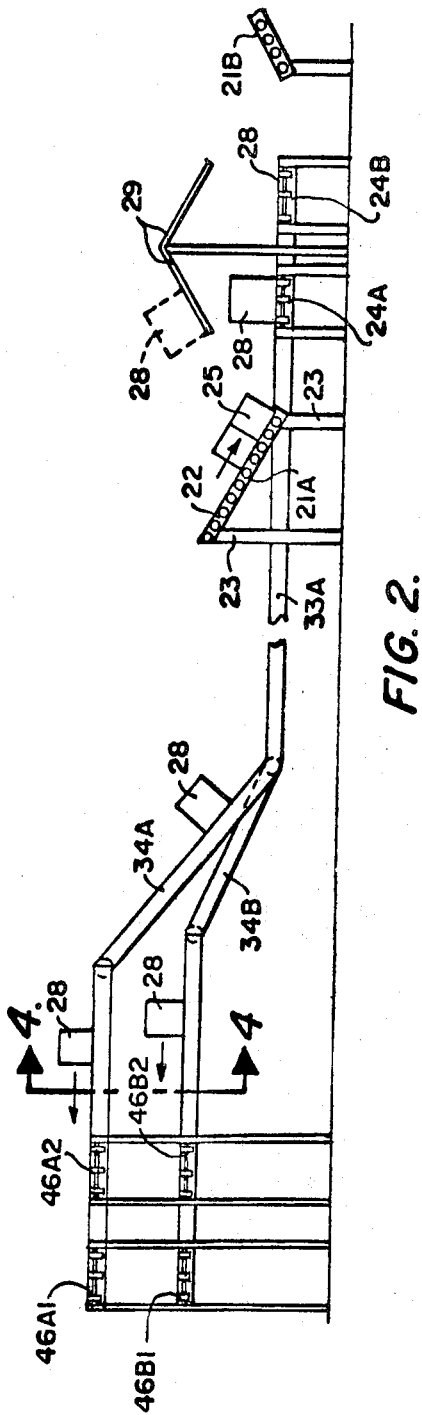

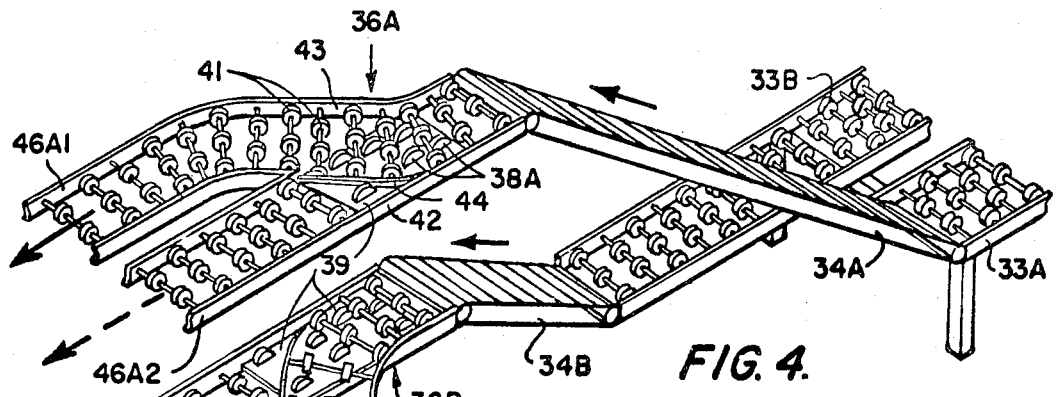
FIG. 4.
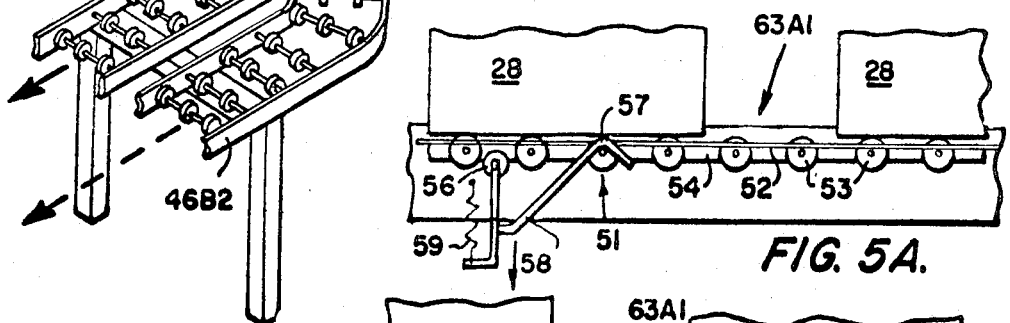
FIG. 5A.
FIG. 5B.
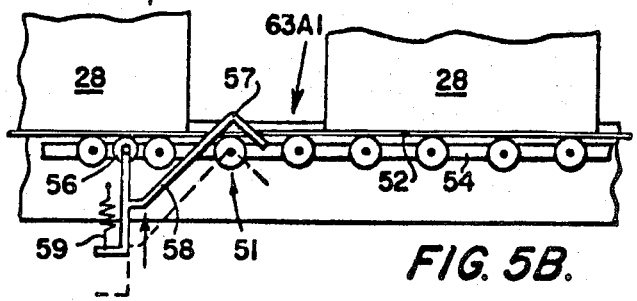
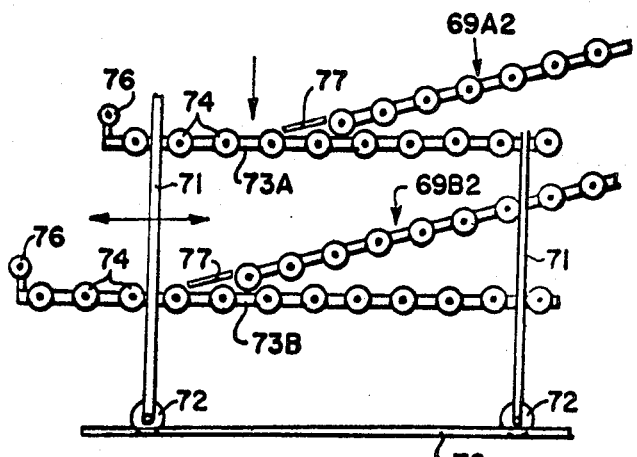
FIG. 6.
INVENTOR.
OWEN L. FIELD
BY
ATTORNEY

ADJUSTABLE PLURAL CONVEYOR

This application is a division of application Ser. No. 873,185, filed Nov. 3, 1969, now U.S. Pat. No. 3,616,944.

This invention relates to a new and improved method and system for filling the orders of customers where there are a large number of delivery routes, each servicing many customers, and where each customer has ordered a variety of different items of merchandise. Heretofore filling such orders in a warehouse has been an inefficient, labor-consuming operation. The present invention provides a systematized means for performing the operation.

A principal object of the present invention is to provide established routes for delivery trucks servicing many customers on each route and organizing and filling the orders of customers so as to permit direct loading of merchandise from the warehouse to the delivery truck in an efficient manner.

Thus, principal features of the invention are considerable savings in labor in filling customers' orders, checking the orders, loading the orders onto trucks, and delivering the orders from the trucks.

Another feature of the invention is the provision of an apparatus which permits merchandise to be conveyed into the cargo compartment of a truck on telescopic conveyors which are initially extended into the front of the cargo compartment and are gradually pushed rearwardly as the truck is filled. Such conveyors deliver the merchandise into the truck by gravity and preferably deliver merchandise in two layers, one immediately above the other, so that the loader can assemble merchandise of one type delivered to a specific customer and merchandise of another type delivered to the same customer.

Other objects of the present invention will become apparent upon reading the following specification and referring to the accompanying drawings in which similar characters of reference represent corresponding parts in each of the several views.

In the drawings:

FIG. 1 is a top plan view of the warehouse and conveyor system in which the present invention is installed, the view being partially schematic.

FIG. 2 is a sectional view taken substantially along the line 2—2 of FIG. 1.

FIG. 3 is a sectional view taken substantially along the line 3—3 of FIG. 1.

FIG. 4 is an enlarged fragmentary perspective view of a portion of the apparatus of FIGS. 1 - 3.

FIG. 5A is an enlarged fragmentary sectional view taken substantially along the line 5—5 of FIG. 1 showing a crowd switch in operative position interrupting movement of cartons of merchandise.

FIG. 5B is similar to FIG. 5A showing the crowd switch in inoperative position.

FIG. 6 is a side elevational view of a truck loading conveyor forming a part of the invention taken substantially along the line 6—6 of FIG. 1.

The method of the present invention finds particular application in the transaction of business of large wholesalers. In the following example it will be assumed that the wholesaler distributes tobacco and similar products from a central warehouse with a number of trucks being loaded and dispatched from the warehouse each day, each truck servicing a large number of customers along its route. It will be understood, however, that the invention finds application in the distribution of many other types of merchandise.

As a preliminary to practice of the method, routes are established for each truck which is delivering merchandise for each day. A route number is assigned to each such delivery route which is keyed to the day of the week on which delivery is made. Each customer for each such route is given a customer number, the numbers being consecutive in the order in which the drivers normally make delivery stops. Thus "M-06-62" designates a Monday delivery of truck No. 6 to customer No. 62 along its route. Where a new customer is obtained or where there is an emergency stop made on an existing route, the number may be designated "M-06-62A," and delivery made to such stop after stop M-06-62, thereby providing flexibility over a period of time.

A distributor, such as one who would use the present method, usually has a considerable number of salesmen who take orders from customers. Usually a salesman does not travel the same route as any particular deliveryman but calls on accounts serviced by several trucks, and many orders are also taken by telephone. Thus, in accordance with practice of the method of the present invention, it is necessary to correlate customers' orders with the delivery routes which have theretofore been established. In addition, in a preferred method of the present invention, the salesman employs two different order forms to accommodate the customers' requirements. For example, Form A may be used to denote the orders for various brands of cigarettes and candies. Form B may be used for cigars and tobacco. Ordinarily, a distributor will have a large number of different brands of merchandise and the various brands will be further subdivided into packages of various sizes. Hence, the order forms contain a very large number of blanks, which are filled in by the salesman as he calls upon the customers. The salesman marks on the forms the particular customer's purchases of each item and the two forms are physically fitted together and then marked with the delivery route number as, for example, "M-06-62." The salesman turns in the orders at the warehouse, and after certain routine processing, a clerk collates all of the forms according to the routes for each day and then sequentially by customer number for each route.

When it is time to fill the orders for a particular route for a particular day, all the orders for such route are filled; using the system hereinafter described in the inverse order of the delivery stops. Thus the merchandise for the last order will be filled first and will be put in the front of the cargo compartment truck (assuming the truck is rear-loading) while the merchandise for the first stop will be filled last and put in the back of the truck so that the deliveryman can conveniently drop off merchandise. Assuming that "M-06-62" is the last stop for the Monday delivery of the sixth route, the warehouseman takes form A for customer 62 and proceeds to take items from the bins and place them in an empty box or other suitable container which has been placed on a conveyor. The box is moved along the conveyor station-to-station so that the first-mentioned (or usually several) warehouseman puts merchandise into the box in sequence. It is desirable that a single man not have to walk any considerable distance to fill all of the items on form A for the particular customer, and hence the box may be pushed along the conveyor to the station of the next man. Simultaneously, one or more warehousemen place the items which have been ordered on form B for customer 62 in another box on another conveyor. The boxes are pushed along conveyors until all of the items for this particular customer's order have been filled.

When the orders are completely filled, the warehouseman put the A and B order forms into the box as the two conveyors come together at a station and at this station, a clerk removes both the orders from the boxes, and transmits them to a billing clerk who prepares an invoice to the customer setting forth the quantity of each item and the price thereof. Preparing the invoices requires a certain amount of time.

While the invoice is being prepared, each of the conveyors on which the boxes rest mechanically elevate the boxes onto a storage conveyor of extended length, each storage conveyor having two levels. Thus the merchandise on the A Form travels on a conveyor directly above the merchandise on the B Form. There is a switch at the entrance of each of these storage conveyors which directs the merchandise to one or the other of two substantially identical storage conveyors. All of the merchandise for Route 6 makes the switch to the first conveyor and when the filling of merchandise for Route 6 is completed, additional merchandise for Route 7 (e.g.) is switched to a second storage conveyor. Each storage conveyor has a capacity to accommodate merchandise sufficient to fill a truck. Preferably, the storage conveyors are elevated so that the space beneath them may be used to warehouse various items. The storage conveyors have a stretch about at floor level for a checking station. By the time the merchandise gets to the checking station, the invoices have been prepared and a checker then checks the contents of each box with the invoice which has been written up while the box is traversing the storage conveyor and necessary corrections made.

After leaving the checking station, the merchandise is elevated so that it may travel by gravity on roller conveyors to the trucks. A special telescopic double-deck loading conveyor is provided and is hereinafter described in detail. The Form A merchandise travels on the upper conveyor and the Form B merchandise on the lower conveyor. There is an extendable section for each conveyor which partially slides under the ends of the permanent conveyor, the extendable section being sloped downward so that it is in practical effect a continuation of the fixed section but is of a lesser slope. The telescopic section is initially pushed into the truck body so that it discharges near the front end of the body, but as the truck is filled up, the telescopic section is pushed back until the truck is fully loaded. The loader takes the A merchandise and the B merchandise and either combines them in a single box or places the two boxes in proximity.

While the merchandise for Route 6 is being loaded into the truck, the merchandise for Route 7 is being selected from the bins and loaded into a second storage conveyor while invoices are being prepared. When the truck for Route 6 drives away, the truck from Route 7 backs into the dock and the merchandise for the seventh route is loaded as soon as it has been checked. Meanwhile, the merchandise for the eighth route is being loaded onto the first conveyor.

After the truck is loaded the driver travels to the first stop and there unloads the merchandise for the first customer on the route, such merchandise being at the rear of the truck where it is most readily accessible. Both A and B items of merchandise are removed and delivered to the first customer and the subsequent customers in order.

An appropriate system for practice of the foregoing method is illustrated in the accompanying drawings. A plurality of merchandise bins 21 is provided. It will be understood that a tobacco and candy distributor normally provides customers with a large variety of items. The most popular items are stored in bins which are the most accessible during loading. As has been previously mentioned, in a preferred form of the invention two types of merchandise are sold, hereinafter designated A and B. For example, A merchandise may be cigarettes and candy while the B merchandise may be cigars and tobacco. Directing attention to FIG. 2, a bin 21A may have several short downward slanted roller conveyors 22, one above the other, which are supported by legs 23 of unequal lengths, so that the roller conveyors slope toward the loading station. Boxes of merchandise received from the manufacturer are loaded into the high end of the roller conveyors 22 and orders are filled from the boxes 25 at the lower end of the bin 21. There are a plurality of bins 21A on which the A merchandise is stored and it will further be understood that less popular items are stored on other types of racks or bins. Similarly, the B merchandise is stored in racks or bins designated 21B.

Adjacent the discharge ends of the bins 21A and 21B are two horizontal conveyors 24A, 24B of extended length. The loading conveyors 24 may be of a manual type in that the boxes 28 into which the merchandise is loaded are manually moved from station to station along the length of the conveyor. However it will be understood that power driven conveyors may be substituted. In FIG. 1 of the accompanying drawings, the loading conveyors 24A and 24B are divided at point "X" and the merchandise from Form A is loaded to the right of point "X" as indicated by the arrows in FIG. 1. The Form B merchandise is loaded commencing at point X, directed to the left, and then around the reverse bend 26 and along the back stretch 27 of the conveyor. As here shown, there are considerably more bins 21B for the B type merchandise than there are bins 21A for the A type merchandise, but this is a matter of choice depending upon the requirements of customers.

Ordinarily there will be several warehousemen working on each stretch of the conveyor, some filling part of each order as the order moves down the loading conveyor. Empty boxes 20A may be stored in racks 29 over the conveyor 24. Thus an empty box is used and placed on one of the conveyors, either 24A or 24B, and the warehouseman then begins putting merchandise from the bins 21A into the empty box and when he has filled the order insofar as bins are adjacent his station, he pushes the box along the conveyor to the next warehouseman who further fills the order. After the last warehouseman has filled the last item on the order of the particular customer, he puts the order form (A or B, as the case may be) into the box along with the merchandise.

At Station 31 the loading conveyors for Form A merchandise and Form B merchandise come together immediately before the curves 32A and 32B of the two conveyors respectively. A clerk takes from the boxes the salesman's order forms which now have been completely filled and transmits the order forms to a billing clerk. The billing clerk prepares an invoice for the merchandise to be delivered to each customer on the route. Billing a customer ordinarily takes an appreciable amount of time and hence it is necessary to store the merchandise while the billing is taking place. The means of storing the merchandise is hereinafter explained. After the order for customer "M-06-62" has been filled, the warehouseman takes the next lowest numbered customer on the route and begins filling the orders of that particular customer in the same manner as has been described.

The storage of orders in the sequence in which they have been filled is an important part of the present invention. Thus the A merchandise moves along a straight conveyor stretch 33A which leads to an upward inclined belt conveyor 34A which elevates the merchandise to a position near the ceiling of the warehouse. At the top of the belt conveyor 34A is a diverging spur curve switch 36A of a type well known in the conveyor industry and illustrated in detail in FIG. 4. Certain rollers 38A are movable in the sense that they are mounted on a plate 39 which can be raised and lowered by a motor (not shown) under the control of an electric switch 37 adjacent to station 31. Other rollers 41 are fixed and direct merchandise rolling thereon around a curve. Straight rail 42, inside rail 43 and sweep rail 44 direct the merchandise either straight ahead or around the curve under the control of the movement of plate 39. When plate 39 is depressed, only the fixed rollers 41 are contacted by the merchandise and hence the merchandise curves on to conveyor section 46A1. When plate 39 is elevated, the movable rollers 38 are engaged by the merchandise because they are higher than rollers 41 and direct the merchandise along straight stretch 46A2 which is the beginning of one of the four storage conveyors which are illustrated herein.

The Form B merchandise leaves station 31 around curve 32B and traverses straight stretch 33B and then goes up the upward inclined belt conveyor 34B, which is at a lesser pitch than conveyor 34A, to switch 36B which is similar to switch 36A and is controlled either by a single electric switch 37 or by a separate switch. The inter-relationship of the switches 36A and 36B is such that one of the switches always curves the merchandise to one side while the other switch directs the merchandise straight ahead. When the setting of one of the switches is changed, the setting of the other switch is simultaneously changed. Thus switch 36A directs the merchandise either to storage conveyor 46A1 or to 46A2. When switch 36A is directing the merchandise to stretch 46A1, switch 36B is directing the merchandise to stretch 46B1. Conversely, when switch 36A is directing the merchandise to stretch 46A2, stretch 36B is directing the merchandise to stretch 46B2. Stretch 46A1 is directly above stretch 46B1 while stretch 46A2 is directly above stretch 46B2. The stretches 46 are preferably downwardly inclined and go around curves 47, which are optional depending upon the dimensions and layout of the warehouse, to a long double-deck storage conveyor 48A1, 48B1 or 48A2, 48B2. Stretches 61 are continuations of stretches 48, at different elevations, depending on the warehouse structure.

The conveyor stretches 61 terminate in downward inclined belt conveyors 49, there being one such belt for each of the four conveyors.

Adjacent the lower end of belt conveyors 49 are crowd switches 51, one such switch being installed in connection with each conveyor. These are shown as 65A and 65B and are shown installed in a conveyor stretch which is designated 63A1, it being understood that the other switches are similar. A continuous belt 52 is driven by an electric motor (not shown). On either side of belt 52 are rollers 53 which are mounted in a frame 54. A lifting pulley 56 is mounted for vertical reciprocation and engages the underside of the top stretch of belt 52. Interposed in the path of boxes 28 travelling along the conveyor stretch 63A1 is a contactor 57 which is angular in shape. When a box 28 is resting on the contactor 57, the connecting link 58 is depressed causing lifting pulley 56 to be depressed and thereby causing the belt 52 to be at a lower elevation than the fixed rollers 53. The next box 28 is stopped since the rollers 53 are not power driven. When the box 28 which has been resting on contactor 57 is moved away, contactor 57, connecting link 58 and pulley 56 are raised by spring 59. Raising of pulley 56 raises the upper stretch of belt 52 above the level of rollers 53 and hence belt 52 moves the next box 28 to the left as viewed in FIGS. 5A and 5B. By the time the merchandise reaches stretch 63 the invoices for the individual customers have been prepared and the merchandise which is to fill each customer's order on Form A or Form B is checked for accuracy. The capacity of conveyor systems 63A1 – 48A1 – 46A1 and 63B1 – 48B1 – 46B1 is sufficient to fill an entire truck. Th dise is accumulating on this system while merchandise is being loaded into another truck on the system 63A2, 48A2, 46A2 and 63B2, 48B2, 46B2.

After the merchandise has been checked, it is conveyed along and is raised by upward inclined belt conveyor system 62 along straight stretches 63 and then down.

After the merchandise has been checked, a short upward inclined elevator system may be used to raise the merchandise to a sufficient height so that it will roll by gravity into a truck. The elevators 64A1, 64B1 and, on the other side, 64A2, 64B2, perform this function. To permit the conveyor system to load two separate trucks, there are bends 63, outward diverging stretches 67 and bends 68 in each of the conveyors so that the terminal stretches 69 are parallel and spaced apart to load trucks docked side-by-side.

Directing attention to FIG. 6, the truck loading conveyors are shown. Stretch 69A2 and stretch 69B2 are downwardly inclined so that the merchandise which is deposited thereon rolls downwardly by gravity. Each of these stretches terminates a considerable distance from the floor. A telescopic double-deck conveyor is supported by legs 71 having wheels 72 at their bottoms which fit into track 70 on the floor. An upper frame 73A is connected to the legs 71 and a lower frame 73B is likewise connected. Frames 73A and 73B have rollers 74 mounted thereon. A stop 76, which may consist of a plurality of rollers elevated above the levels of rollers 74 is located at the outer end of the telescopic section and stops the merchandise. A hinged, plate-like ramp 77, is located at the end of each conveyor stretch 69 and supports merchandise as it is transferring from stretch 69 to stretch 73. In use of the telescopic device, when a truck is ready to load, it is backed into a dock adjacent the termination of one of the conveyor systems 69. The telescopic section is moved into the body of the truck by pulling it to the left until the stops 76 are adjacent to the front of the truck cargo compartment. The merchandise comes down the conveyor stretches 69A2 and 69B2 and is directed onto the sections 73A and 73B by ramps 77. When the merchandise reaches stop 76, the truck loader removes the A and B merchandise for the last customer on the route, placing the two boxes in proximity to each other or consolidating the two boxes into one. The truck is gradually loaded and the telescopic section is pushed to the right as viewed in FIG. 6 as the truck is being loaded.

Deliveries are then made in sequence working toward the front of the cargo compartment.

What is claimed is:

1. A truck loading conveyor comprising a stationary frame, a first conveyor mounted sloping downwardly-forwardly on said first frame, a second frame having two front and two rear legs each having a wheel on its lower end, a ground engaging track in which said wheels roll guiding movement of said second frame between projected and retracted position, and a second conveyor mounted on said second frame at a lesser pitch than said first conveyor, a third conveyor mounted on said stationary frame approximately parallel to said first conveyor and below said second conveyor, a fourth conveyor mounted on said second frame approximately parallel to said second conveyor and below said second conveyor, a first ramp resting on said second conveyor, first hinge means mounting said first ramp on the lower end of said first conveyor, a second ramp resting on said fourth conveyor, second hinge means mounting said second ramp on the lower end of said third conveyor, and an upward-forward elevator having two tracks terminating at the upper ends of said first conveyor and said third conveyor, respectively, said second conveyor slidable between said first and third conveyors, said fourth conveyor slidable under said third conveyor said legs fixed to the outsides of said second and fourth conveyors and clearing said first and third conveyors when said second frame is moved to a retracted position.

* * * * *